(12) United States Patent
Malladi

(10) Patent No.: US 7,215,930 B2
(45) Date of Patent: May 8, 2007

(54) METHOD AND APPARATUS FOR PROVIDING UPLINK SIGNAL-TO-NOISE RATIO (SNR) ESTIMATION IN A WIRELESS COMMUNICATION

(75) Inventor: Durga P. Malladi, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 232 days.

(21) Appl. No.: 10/794,917

(22) Filed: Mar. 5, 2004

(65) Prior Publication Data

US 2005/0014470 A1    Jan. 20, 2005

Related U.S. Application Data

(60) Provisional application No. 60/452,790, filed on Mar. 6, 2003.

(51) Int. Cl.
*H04B 17/00* (2006.01)

(52) U.S. Cl. ............... 455/67.11; 455/450; 455/67.13; 455/63.1; 455/501; 455/446; 455/447; 370/330; 370/337; 370/342; 375/260; 375/265; 375/343

(58) Field of Classification Search ............ 455/67.11, 455/450, 446, 447, 501, 67.13, 63.1; 370/330, 370/337, 342
See application file for complete search history.

(56) References Cited

U.S. PATENT DOCUMENTS 5,809,059 A * 9/1998 Souissi et al. ............. 375/133
5,903,608 A * 5/1999 Chun ......................... 375/260
5,969,751 A * 10/1999 Lee ............................. 348/21
5,991,271 A * 11/1999 Jones et al. .................. 370/252
6,014,373 A * 1/2000 Schilling et al. ............ 370/342
6,088,387 A * 7/2000 Gelblum et al. ............ 375/222
6,201,576 B1 * 3/2001 Raghunath et al. ......... 348/558
6,201,954 B1 * 3/2001 Soliman .................. 455/226.2
2002/0154610 A1   10/2002 Tiedemann, Jr. et al.

FOREIGN PATENT DOCUMENTS

WO        0199312       12/2001
WO        0201762       1/2002

* cited by examiner

*Primary Examiner*—Marceau Milord
(74) *Attorney, Agent, or Firm*—Thomas R. Rouse; Thien T Nguyen; George J. Oehling

(57) ABSTRACT

A method and apparatus for providing uplink signal-to-noise ratio (SNR) estimation in a wireless communication system. A first signal is received over a first channel and a second signal is received over a second channel, where the second signal is received at a higher signal power level than said first signal. A signal-to-noise ratio (SNR) of the second signal is measured, and the SNR of the first signal is determined based at least in part upon the measured SNR of the second signal.

37 Claims, 7 Drawing Sheets

METHOD AND APPARATUS FOR PROVIDING UPLINK SIGNAL-TO-NOISE RATIO (SNR) ESTIMATION IN A WIRELESS COMMUNICATION

CLAIM OF PRIORITY UNDER 35 U.S.C. §119

This application claims priority to U.S. Provisional Application No. 60/452,790 filed Mar. 6, 2003, entitled "Method and Apparatus for a Reverse Link Communication in a Communication System," and assigned to the assignee hereof and hereby expressly incorporated by reference herein.

BACKGROUND

1. Field

The present invention relates generally to communication systems, and, more specifically, to a method and apparatus for providing uplink signal-to-noise ratio (SNR) estimation in a wireless communication system.

2. Background

Wireless communication technologies have seen explosive growth over the past few years. This growth has been primarily fueled by wireless services providing freedom of movement to the communicating public as opposed to being "tethered" to a hard-wired communication system. It has also been fueled by the increasing quality and speed of voice and data communications over the wireless medium, among other factors. As a result of these enhancements in the communications field, wireless communications has had, and will continue to have, a significant impact on a growing number of the communicating public.

One type of wireless communication system includes a Wideband Code Division Multiple Access (W-CDMA) system, which is configured to support both voice and data communications. This system may have multiple base transceiver sites that communicate over a wireless link with a plurality of mobile terminals. The base transceiver site transmits data and control information to the mobile terminal over a set of forward link channels and the mobile terminal transmits data and control information to the base transceiver site over a set of reverse link channels. In particular, the reverse link channels transmitted from the mobile terminal to the base transceiver site include a pilot channel, traffic channel, and rate indicator channel, among others. The traffic channel transmits data from the mobile terminal to the base transceiver site. The rate indicator channel provides a data rate to the base transceiver site indicating the rate at which data is being transmitted over the traffic channel. The pilot channel may be used by the base transceiver site for an amplitude and phase reference for demodulating the data on the traffic channel.

The reverse link channels are typically power controlled to compensate for variations in the received signals due to variations through the communication medium between the mobile terminal and base transceiver site. This power control process is usually based on measuring the signal-to-noise ratio (SNR) of the pilot channel. For example, the base transceiver site periodically measures the SNR of the pilot channel received from the mobile terminal and compares it to a target SNR. If the measured SNR is below the target SNR, the base transceiver site transmits to the mobile terminal an "UP" command. This directs the mobile terminal to increase the power level of the pilot channel, as well as the other channels. If the measured SNR is above the target SNR, the base transceiver site sends a "DOWN" command to the mobile terminal. This directs the mobile terminal to decrease the power level of the channels. The mobile terminal increases or decreases the transmit power of the channels by a fixed upward or downward step.

Typically, as the data rate on the traffic channel increases, the signal power of the traffic channel is also increased by the mobile terminal to accommodate the increased data rate. For an efficient operation of the communication link, the pilot power typically needs to be increased to provide better phase estimation for the higher data rates. However, because the maximum total signal power at which the mobile terminal may transmit over each of the reverse link channels is limited to a finite amount of power, the signal power level of the pilot channel is set to a nominal signal power level to enable an increase in the signal power level of the traffic channel to accommodate the increased data rate and minimize the pilot channel overhead. By keeping the signal power level of the pilot channel to a nominal signal power level, the estimation of the SNR of the pilot channel may not be as precise as if it were transmitted at a higher signal power level. As a result, the inner-loop power control of the wireless communication system may be adversely impacted due to the decreased reliability in the measured SNR of a lower signal power level transmitted on the pilot channel.

The present invention is directed to overcoming, or at least reducing the effects of, one or more problems indicated above.

SUMMARY

In one aspect of the invention, a method in a wireless communication system is provided. The method comprises receiving a first signal over a first channel and a second signal over a second channel, where the second signal is received at a higher signal power level than the first signal. A signal-to-noise ratio (SNR) of the second signal is measured, and the SNR of the first signal is determined based at least in part upon the measured SNR of the second signal.

In another aspect of the invention, an apparatus is provided. The apparatus comprises at least one transmitter for transmitting a first signal over a first channel and a second signal over a second channel, where the second signal is transmitted at a higher signal power level than the first signal. The system further comprises at least one receiver for receiving the first and second signals. The receiver measures a signal-to-noise ratio (SNR) of the second signal and determines the SNR of the first signal based at least in part upon the measured SNR of the second signal.

In another aspect of the invention, a device is provided. The device comprises a receiver for receiving a first signal over a first channel and a second signal over a second channel, where the second signal is received at a higher signal power level than the first signal. The receiver device further comprises a processor for measuring a signal-to-noise ratio (SNR) of the second signal and determining the SNR of the first signal based at least in part upon the measured SNR of the second signal.

In another aspect of the invention, a mobile terminal is provided. The mobile terminal comprises a transmitter that transmits a first signal over a first channel and a second signal over a second channel to a base transceiver site, where the second signal is transmitted at a higher signal power level than the first signal. The base transceiver site receives the first and second signals, measures a signal-to-noise ratio (SNR) of the second signal, and determines the SNR of the first signal based at least in part upon the measured SNR of the second signal.

In another aspect of the invention, a computer readable media embodying a method for a wireless communication system is provided. The method comprises receiving a first signal over a first channel and a second signal over a second channel, where the second signal is received at a higher signal power level than the first signal. A signal-to-noise ratio (SNR) of the second signal is measured, and the SNR of the first signal is determined based at least in part upon the measured SNR of the second signal.

DETAILED DESCRIPTION

Figure 1:
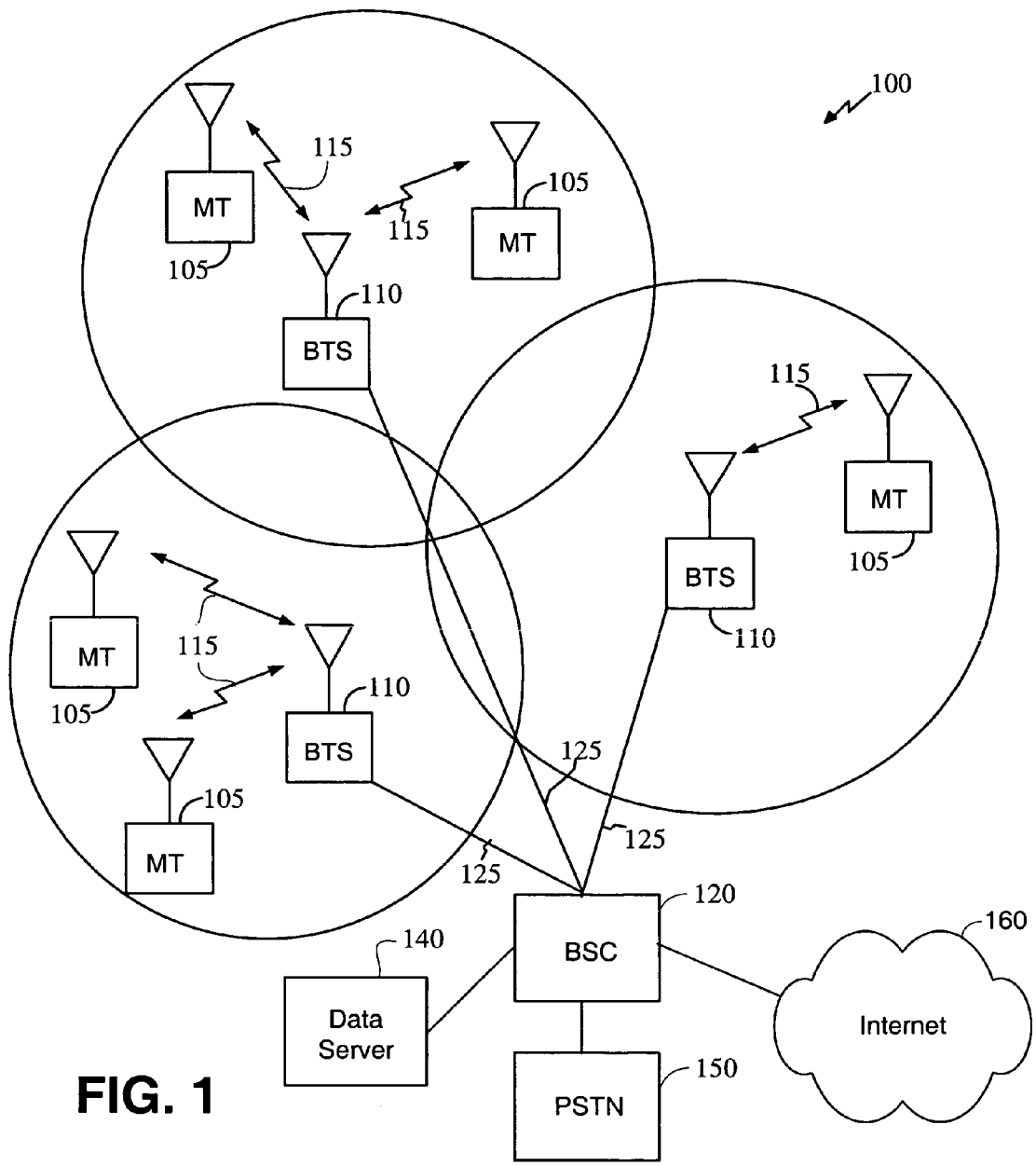
FIG. 1 is a block diagram of a wireless communication system in accordance with one illustrative embodiment of the present invention.

Turning now to the drawings, and specifically referring to FIG. 1, a wireless communication system 100 is shown in accordance with one embodiment of the present invention. The wireless communication system 100 comprises a plurality of mobile terminals (MT) 105 that communicate with a plurality of base transceiver sites (BTS) 110, which are geographically dispersed to provide continuous communication coverage with the mobile terminals 105 as they traverse the wireless communication system 100.

The mobile terminals 105 may, for example, take the form of wireless telephones, personal information managers (PIMs), personal digital assistants (PDAs), or other types of computer terminals that are configured for wireless communication. The base transceiver sites 110 transmit data to the mobile terminals 105 over a forward link of a wireless communication channel 115, and the mobile terminals 105 transmit data to the base transceiver sites 110 over a reverse link of the channel 115.

In one embodiment, the wireless communication system 100 conforms generally to a release of the W-CDMA (Wideband Code Division Multiple Access) specification. W-CDMA is a 3rd Generation (3G) wireless communication standard that is based on the IS-95 standard. In accordance with the illustrated embodiment, the wireless communication system 100 is intended to operate utilizing 3GPP ($3^{rd}$ Generation Partnership Project) Release 6 of the W-CDMA standard, but other embodiments may be implemented in other releases of the W-CDMA standard. In an alternative embodiment, the wireless communication system 100 may operate in accordance with 3GPP2 Revision D of the cdma2000 standard. It will be appreciated that the embodiments described herein should be considered as exemplary rather than limiting. Accordingly, the system 100 may take the form of various other types of wireless communication systems without departing from the spirit and scope of the present invention.

Each base-transceiver site 110 is coupled to a base station controller (BSC) 120, which controls connections between the base transceiver sites 110 and other communication system components of the wireless communication system 100. The base transceiver sites 110 and the base station controller 120 collectively form a radio access network (RAN) for transporting data to and from the plurality of mobile terminals 105 that communicate within the wireless communication system 100. The base transceiver sites 110 are coupled to the base station controller 120 by communication links 125, which may take the form of a wireline E1 or T1 link. The communication links 125, however, may alternatively be embodied using any one of a number of wired or wireless communication mediums including, but not necessarily limited to, microwave, optical fiber, and the like. Additionally, the simplified depiction of the wireless communication system 100 in FIG. 1 is merely for ease in conveying the present invention. It will be appreciated, however, that the wireless communication system 100 may be configured with any number of mobile terminals 105, base transceiver sites 110, and base station controllers 120 without departing from the spirit and scope of the present invention.

The base station controller 120 may be coupled to various communication system components to effectively extend the communication capabilities available to the mobile terminals 105 beyond the wireless communication system 100. The communication system components may include a data server 140, a public switched telephone network (PSTN) 150, and the Internet 160 for access by the mobile terminals 105. It will be appreciated that the communication system components illustrated in FIG. 1 are for exemplary purposes only, and that the wireless communication system 100 may be interfaced with various other types of communication system components without departing from the spirit and scope of the present invention.

Figure 2:
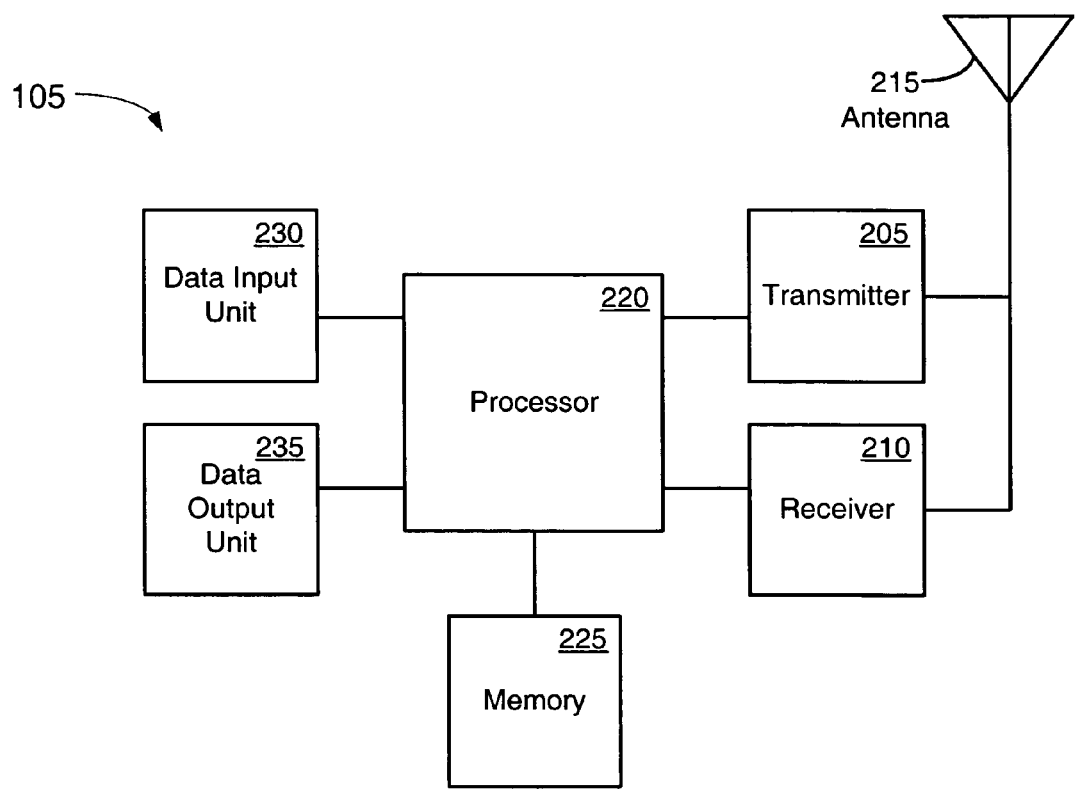
FIG. 2 shows a more detailed representation of a mobile terminal that communicates in the wireless communication system of FIG. 1.

Turning now to FIG. 2, a more detailed representation of the mobile terminal 105 is shown in accordance with one embodiment of the present invention. In one of its simpler forms, the mobile terminal 105 comprises a transmitter 205 for transmitting data over the reverse link of the wireless communication channel 115 to the base transceiver sites 110. The mobile terminal 105 also includes a receiver 210 for receiving data transmitted from the base transceiver sites 110 over the forward link of the wireless communication channel 115. In an alternative embodiment, the transmitter 205 and receiver 210 may be combined into a single transceiver unit as opposed to being embodied as two separate entities as illustrated in the figure. The transmitter 205 and the receiver 210 are coupled to an antenna 215 to facilitate the wireless transmission and reception of data over the wireless communication channel 115.

The mobile terminal 105 further comprises a processor 220 for controlling various operating functions and a memory 225 for storing data. In one embodiment, the processor 220 may take the form of a digital signal processor (DSP) chip. It will be appreciated, however, that the processor 220 may take the form of various other commercially-available processors or controllers.

The mobile terminal 105 also comprises a data input unit 230, which provides data for transmission to the base transceiver sites 110 over the wireless communication channel 115. The data input unit 230 may take the form of a microphone or an input from a data generating device, such as a computer terminal, for example. It will be appreciated that the data input unit 230 may be implemented in various other forms to provide data to the processor 220, and, thus, need not necessarily be limited to the aforementioned examples.

The data received through the data input unit 230 is processed by the processor 220 and then forwarded to the transmitter 205 for transmission over the reverse link of the wireless communication channel 115 to the base transceiver sites 110. Data received by the receiver 210 over the forward link of the wireless communication channel 115 from the base transceiver sites 110 is forwarded to the processor 220 for processing and then to data output unit 235 for various purposes, such as presentation to the user of the mobile terminal 105, for example. The data output unit 235 may take the form of at least one of a speaker, visual display, and an output to a data device (e.g., a computer terminal), or any combination thereof. It will be appreciated that the data output unit 235 may comprise various other visual or aural perceptible devices, and, thus, need not necessarily be limited to the aforementioned examples. Furthermore, the simplified depiction of the mobile terminal 105 in FIG. 2 is merely for ease in conveying the present invention. Accordingly, it will also be appreciated that the mobile terminal 105 may include other components to enable various other features and/or capabilities of the mobile terminal 105 than those illustrated.

Figure 3:
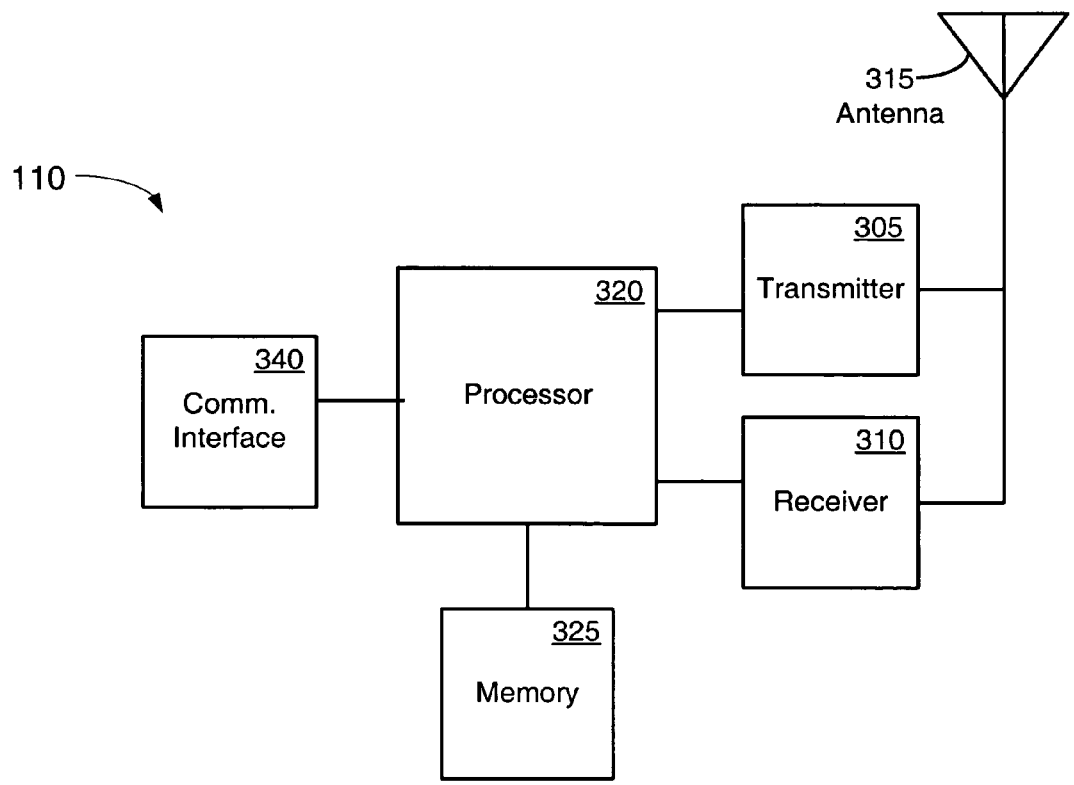
FIG. 3 depicts a more detailed representation of a base transceiver site within the wireless communication system of FIG. 1.

Referring now to FIG. 3, a more detailed representation of the base transceiver site 110 is shown according to one embodiment of the present invention. In one of its simpler forms, the base transceiver site 110 comprises a transmitter 305 for transmitting data over the forward link of the wireless communication channel 115 to the mobile terminal 105, and a receiver 310 for receiving data from the mobile terminals 105 over the reverse link of the wireless communication channel 115. In an alternative embodiment, the transmitter 305 and receiver 310 may be combined into a single transceiver unit as opposed to being embodied as two separate entities as illustrated. The transmitter 305 and the receiver 310 are coupled to an antenna 315 to facilitate the transmission and reception of data over the wireless communication channel 115.

The base transceiver site 110 is further configured with a processor 320 for controlling various operating features and a memory 325 for storing data. In one embodiment, the processor 320 may take the form of a digital signal processor (DSP) chip. It will be appreciated, however, that the processor 320 may take the form of various other commercially-available processors or controllers. The base transceiver site 110 further comprises a communication interface 340 for interfacing the base transceiver site 110 to the base station controller 120. It will be appreciated that the base transceiver site 110 may be configured with additional components to perform a variety of other functions than those illustrated.

Figure 4:
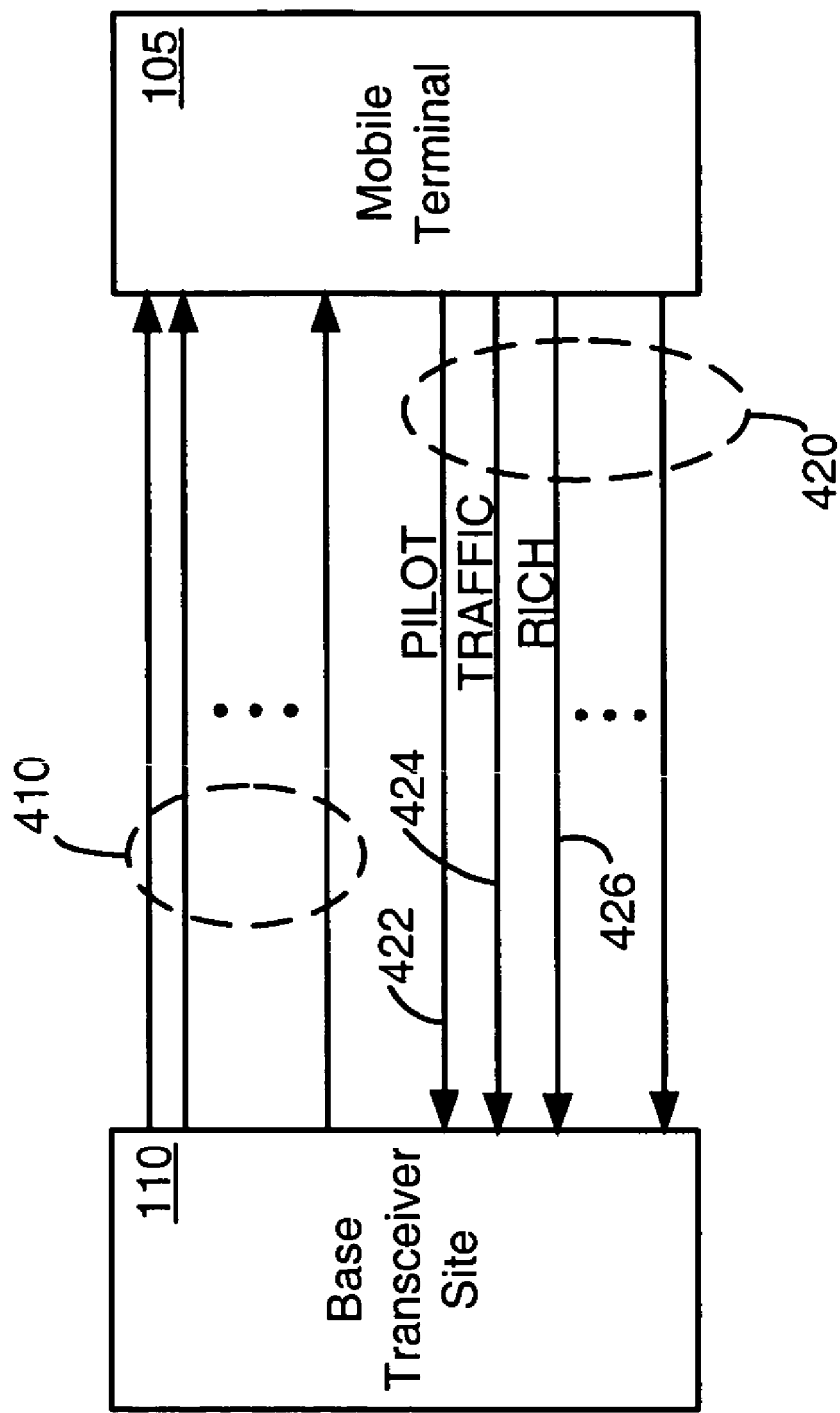
FIG. 4 is a diagram illustrating forward and reverse link channels used between the mobile terminal and the base transceiver site.

The wireless communication channel 115 includes various channels for communication between the base transceiver site 110 and the mobile terminal 105. Referring to FIG. 4, a diagram illustrating the plurality of channels between the base transceiver site 110 and the mobile terminal 105 is shown. Base transceiver site 110 transmits data to mobile terminal 105 via a set of forward link channels 410. These forward link channels 410 typically include data channels through which data is transmitted and control channels through which control signals are transmitted.

Mobile terminal 105 transmits data to the base transceiver site 110 via a set of reverse link channels 420, which also include both data and control channels. In particular, the mobile terminal 105 transmits information to the base transceiver site 110 over a dedicated physical control channel (DPCCH) (e.g., a pilot channel) 422, a dedicated physical data channel (R-DPDCH) (e.g., a traffic channel) 424, and a rate indicator channel (R-RICH) 426.

The information transmitted over these reverse link channels 420 from the mobile terminal 105 to the base transceiver site 110 is represented by bits. Several bits are grouped together into a frame and encoded into modulation symbols. The modulation symbols are then transmitted over the appropriate reverse link channels 420 to the base transceiver site 110. For example, rate indicator bits are encoded into rate indicator modulation symbols and are then transmitted over the rate indicator channel R-RICH 426. Similarly, bits of traffic data are encoded into data modulation symbols, and transmitted over the traffic channel R-DPDCH 424.

The traffic channel R-DPDCH 424 carries a signal comprising frames of data from the mobile terminal 105 to the base transceiver site 110. The data rate at which these frames are transmitted is typically variable. Usually, as the data rate over the traffic channel R-DPDCH 424 increases, the amount of power needed to transmit the data traffic signal over the traffic channel R-DPDCH 424 also increases.

The rate indicator channel R-RICH 426 carries a signal comprising rate indicator frames that correspond to the data traffic frames transmitted on the traffic channel R-DPDCH 424. Each of the rate indicator frames identifies the data rate of the corresponding data traffic frame. The rate indicator channel R-RICH 426 further carries Hybrid Automatic Repeat Request (HARQ) information (such as sub-packet ID, redundancy version, etc.), which enables the base transceiver site 110 to decode the traffic channel R-DPDCH 424. The HARQ bits enable the base transceiver site 110 to either soft-combine the received data symbols with previous transmissions over the traffic channel R-DPDCH 424 prior to decoding or to decode the received symbols independently. The rate indicator channel R-RICH 426 typically has a fixed, low data rate.

The pilot channel DPCCH 422 carries a pilot signal that provides an amplitude and phase reference, for example, for demodulating the data on the traffic channel R-DPDCH 424. Accordingly, the pilot channel DPCCH 422 may be used as a demodulation reference by the base transceiver site 110 for demodulating received signals from the mobile terminal 105. In accordance with the illustrated embodiment, the pilot signal has a fixed, low data rate to enable the mobile terminal 105 to transmit over the traffic channel R-DPDCH 424 at a higher signal power to accommodate higher data rates transmitted thereover.

Figure 5A:
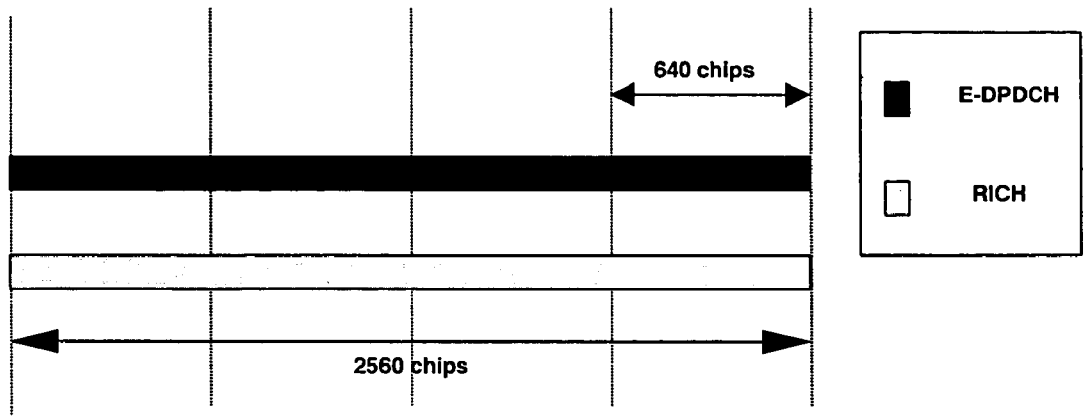
FIGS. 5A and 5B show the transmission of a rate indicator channel in a code division multiplex (CDM) and time division multiplex (TDM) manner, respectively.
Figure 5B:
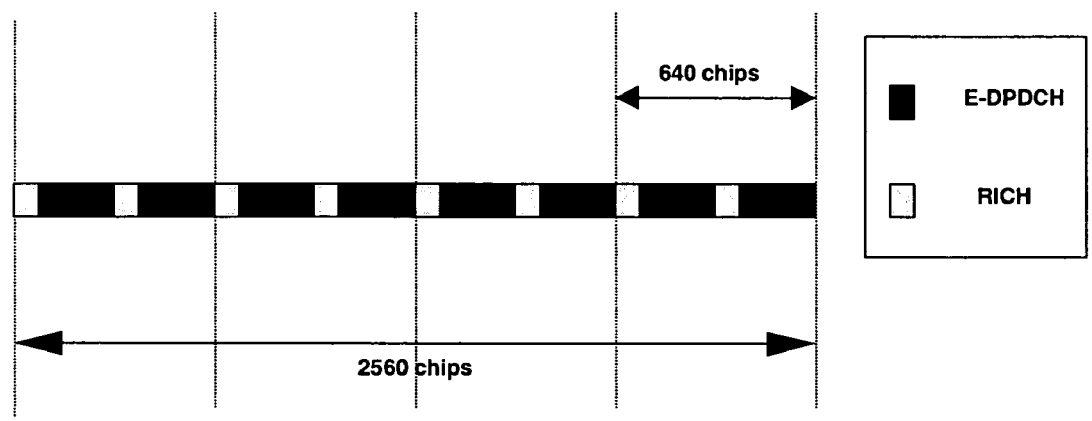

In one embodiment, the rate indicator channel R-RICH 426 is transmitted in a code division multiplex (CDM) manner as illustrated in FIG. 5A, in which the rate indicator channel R-RICH 426 is transmitted on a separate code channel from the traffic channel R-DPDCH 424. In an alternative embodiment, the rate indicator channel R-RICH 426 may be transmitted in a time division multiplex (TDM)

manner with the traffic channel R-DPDCH 424 on the same code channel on a time division basis as illustrated in FIG. 5B.

Typically, as the data rate on the traffic channel R-DPDCH 424 increases, the signal power of the traffic channel R-DPDCH 424 is also increased by the mobile terminal 105 to accommodate the increased data rate. For an efficient operation of the communication link, the pilot power is typically increased to provide better phase estimation for higher data rates. Because the maximum total signal power at which the mobile terminal 105 may transmit over each of the reverse link channels 420 is limited to a finite amount of power, the signal power level of the pilot channel DPCCH 422 is set to a nominal signal power level to enable an increase in the signal power level of the traffic channel R-DPDCH 424 to accommodate the increased data rate and minimize the pilot channel DPCCH 422 overhead.

By keeping the signal power level of the pilot channel DPCCH 422 to a nominal signal power level, however, the estimation of the signal-to-noise ratio (SNR) of the pilot channel DPCCH 422 may not be as precise as if it were transmitted at a higher signal power level. By measuring the SNR of the rate indicator channel R-RICH 426, which is transmitted at a higher signal power level than the pilot channel DPCCH 422, a more accurate estimation of the pilot channel SNR may be determined. As a result of achieving a more accurate SNR of the pilot channel DPCCH 422, the wireless communication system 100 may achieve a more efficient inner-loop power control and symbol scaling for turbo decoding.

Figure 6:
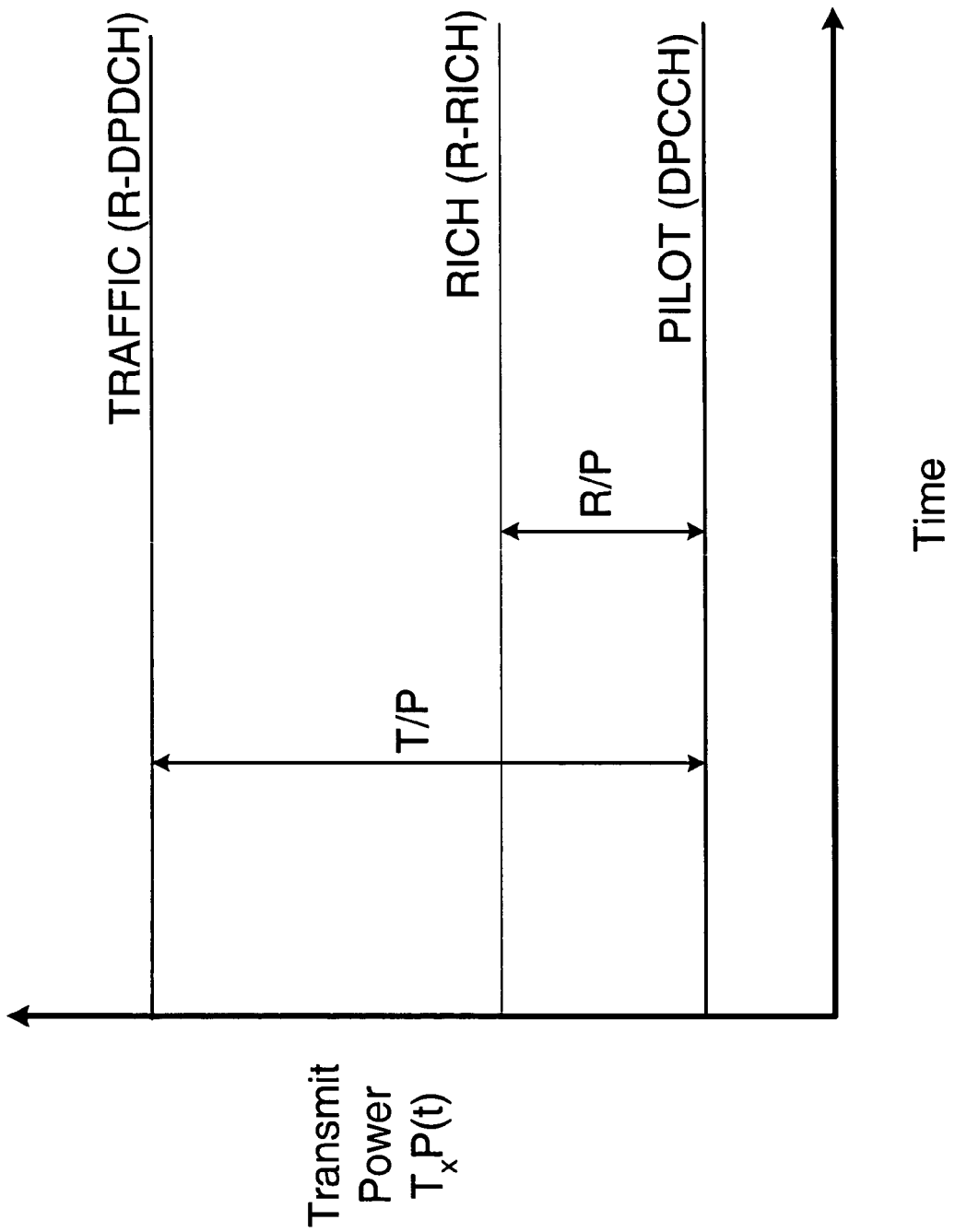
FIG. 6 illustrates a plot conveying the relative signal power levels at which a traffic channel, rate indicator channel, and pilot channel are transmitted by the mobile terminal to the base transceiver site.

Turning now to FIG. 6, a plot illustrating the relative signal power levels at which the traffic channel R-DPDCH 424, rate indicator channel R-RICH 426, and pilot channel DPCCH 422 are transmitted by the mobile terminal 105 to the base transceiver site 110 is shown for a particular data rate. In accordance with the illustrated embodiment, the signal power level of the pilot channel DPCCH 422 is kept to a nominal level to permit the traffic channel R-DPDCH 424 to be transmitted at a higher signal power level to accommodate a higher data rate. In the illustrated embodiment, the traffic-to-pilot (T/P) ratio (i.e., the energy-per-chip ratio of the data signal on the traffic channel R-DPDCH 424 to the pilot signal on the pilot channel DPCCH 422) is kept relatively high as compared to the RICH-to-pilot (R/P) ratio (i.e., the energy-per-chip ratio of the rate indicator signal on the rate indicator channel R-RICH 426 to the pilot signal on the pilot channel DPCCH 422). As the data rate increases over the traffic channel R-DPDCH 424, the difference between the traffic-to-pilot and RICH-to-pilot ratios also increases. The relationship between the traffic-to-pilot and RICH-to-pilot ratios plays a significant role in determining the SNR of the pilot channel DPCCH 422 and the traffic channel R-DPDCH 424.

Figure 7:
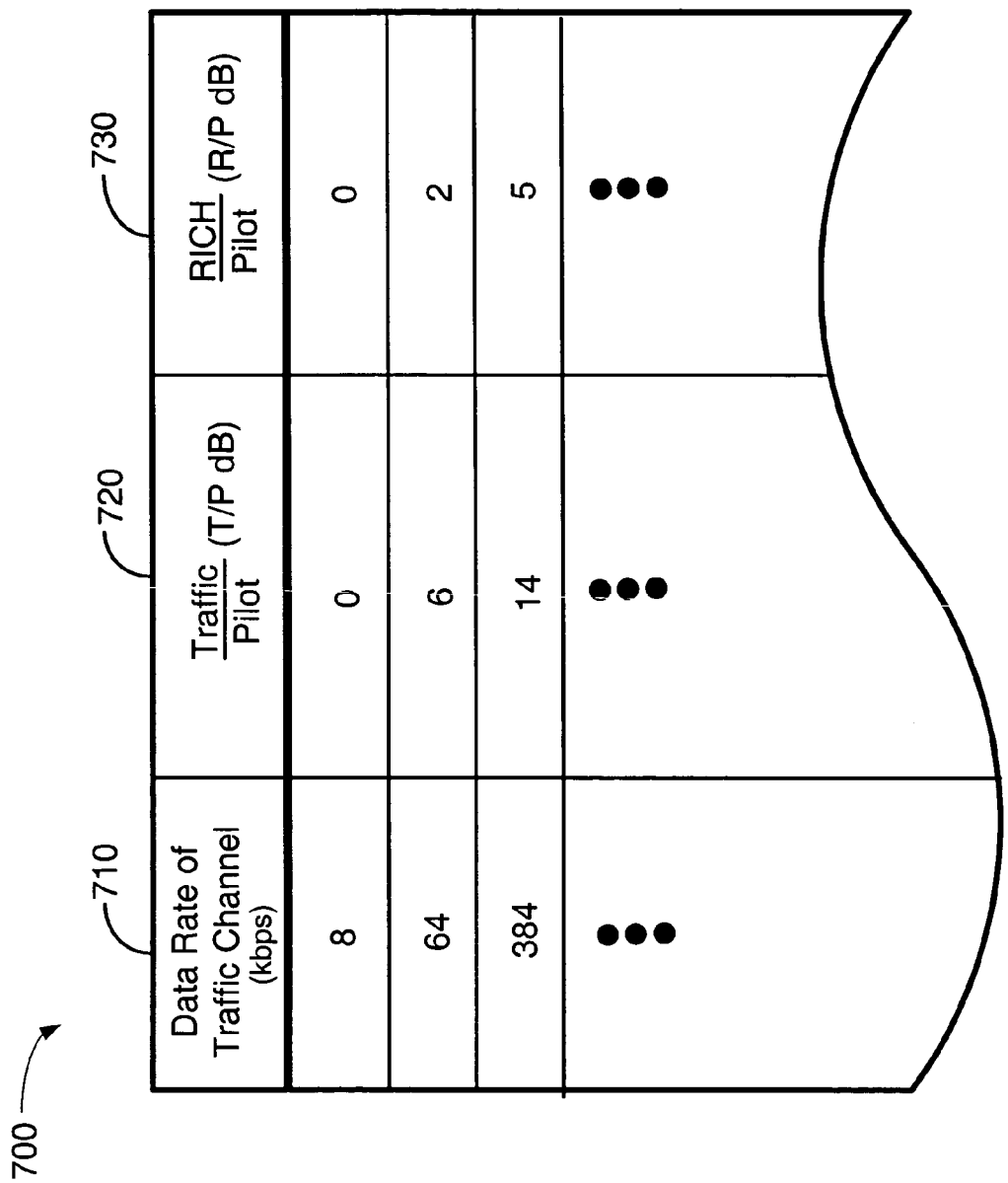
FIG. 7 shows a look-up table, which is stored at the base transceiver site, that provides a relationship between a data rate of the traffic channel, a traffic-to-pilot ratio, and a RICH-to-pilot ratio of the respective reverse link channels.

Referring now to FIG. 7, a look-up table 700 providing a relationship between a data rate 710 of the traffic channel R-DPDCH 424 and a desired traffic-to-pilot ratio 720 and RICH-to-pilot ratio 730 is shown according to one embodiment of the present invention. In accordance with one embodiment, the table 700 is stored within the memory 325 of the base transceiver site 110, and provides the desired traffic-to-pilot ratio 720 and RICH-to-pilot ratio 730 for each particular data rate 710 at which the mobile terminal 105 transmits data over the traffic channel R-DPDCH 424 to the base transceiver site 110. As the data rate 710 of the traffic channel R-DPDCH 424 increases, the difference between the traffic-to-pilot ratio 720 and the RICH-to-pilot ratio 730 increases. It will be appreciated that the specific values of the traffic-to-pilot and RICH-to-pilot ratios 720, 730 for the particular data rates 710 provided within the table 700 are merely exemplary. Accordingly, the values of the traffic-to-pilot and RICH-to-pilot ratios 720, 730 need not necessarily be limited to the examples shown, but may include other values without departing from the spirit and scope of the present invention.

The RICH-to-pilot ratio 730 within the table 700 for a particular data rate 710 is used by the base transceiver site 110 to more accurately estimate the SNR of the pilot channel DPCCH 422 and the traffic channel R-DPDCH 424. Specifically, in one embodiment, the estimated SNR of the pilot channel DPCCH 422 is the product of the measured SNR of the rate indicator channel R-RICH 426 and the inverse of the RICH-to-pilot ratio 730 for a particular data rate 710 over the traffic channel R-DPDCH 424. The symbol SNR for the traffic channel R-DPDCH 424 is the product of the measured SNR of the rate indicator channel R-RICH 426, the inverse of the RICH-to-pilot ratio 730, and the traffic-to-pilot ratio 720 for a particular data rate 710 over the traffic channel R-DPDCH 424. The estimated pilot SNR is used by the base transceiver site 110 to more accurately perform inner-loop power control and the estimated symbol SNR is used for metric scaling in turbo decoding. A more detailed description of how the base transceiver site 110 determines the pilot SNR and symbol SNR is provided below.

To determine the SNR of the pilot channel DPCCH 422, the SNR of the rate indicator channel R-RICH 426 is measured. According to the illustrated embodiment, symbols from the traffic channel R-DPDCH 424 are stored in the memory 325 of the base transmitter site 110 as they are received from the mobile terminal 105. The normalized RICH symbol ($x_k$) from the rate indicator channel R-RICH 426 that is received after pilot filtering (e.g., channel estimation and de-rotation) may be represented by the following equation.

$$x_k = |\alpha_k|^2 \cdot \sqrt{\frac{E_{cp}}{I_o}} \cdot \sqrt{\frac{E_{c,rich} \cdot SF}{I_o}} \cdot e^{j\phi} + \alpha^* \cdot \sqrt{\frac{E_{cp}}{I_o}} \cdot \sqrt{\frac{N_t}{2 \cdot I_o}} \cdot$$
$$\{n_{kI} + j \cdot n_{kQ}\}$$

$$p_k = \alpha \cdot \sqrt{\frac{E_{cp} \cdot SF_p}{I_o}} \cdot e^{j\phi} + \sqrt{\frac{N_t}{2 \cdot I_o}} \cdot \{u_{kI} + j \cdot u_{kQ}\}$$

wherein $\alpha_k$=Fading coefficient $E_{c,rich}$=Energy per RICH chip $E_{cp}$=Energy per Pilot chip SF=Spread Factor of RICH $SF_p$=Spread Factor of Pilot $I_o$=Total Received power spectral density $\phi$=Phase $N_t$=Noise plus Interference power spectral density $n_{kI}$, $n_{kQ}$, $u_{kI}$, $u_{kQ}$=Complex noise plus interference terms The SNR of the rate indicator channel R-RICH 426 may be determined by either accumulating the RICH symbols non-coherently, coherently, or a combination of coherent and non-coherent accumulation. When accumulating the RICH symbols non-coherently, each RICH symbol's energy is summed across the RICH transmission. An example of non-coherent accumulation may be represented by the following equation, which provides an estimate of the RICH symbol energy ($E_{s,rich}/I_o$).

$$\frac{E_{s,rich}}{I_o} = \frac{1}{N} \cdot \sum_{k=0}^{N-1} |x_k|^2$$

An estimate of the noise power spectral density ($N_t/I_o$) is represented by the following equation.

$$\frac{N_t}{I_o} = \frac{1}{N-1} \cdot \sum_{k=0}^{N-2} |p_{k+1} - p_k|^2$$

When accumulating the RICH symbols coherently, the base transceiver site 110 decodes the RICH first. If the RICH symbols are repeated across the transmission, the RICH may be decoded after each transmission. Once the decoding is successfully completed, the base transceiver site 110 knows the transmitted RICH symbols and may then coherently sum the received symbols. An example of coherent accumulation may be represented by the following equation, which provides an estimate of the RICH symbol energy ($E_{s,rich}/I_o$)

$$\frac{E_{s,rich}}{I_o} = |y|^2$$

where:

$$y = \frac{1}{N} \cdot \sum_{k=0}^{N-1} x_k \cdot z_k$$

$z_k$=Estimated RICH symbol at time k

An estimate of the noise power spectral density ($N_t/I_o$) may be represented by the following equation.

$$\frac{N_t}{I_o} = \frac{1}{N-1} \cdot \sum_{k=0}^{N-2} |z_{k+1} \cdot x_{k+1} - z_k \cdot x_k|^2$$

For non-coherent and coherent accumulations, the SNR ($E_{s,rich}/N_t$) of the rate indicator channel R-RICH 426 may then be derived by the following equation.

$$\frac{E_{s,rich}}{N_t} = \frac{E_{s,rich}}{I_o} \cdot \frac{I_o}{N_t}$$

Once the SNR ($E_{s,rich}/N_t$) of the rate indicator channel R-RICH 426 is obtained, the SNR ($E_{c,pilot}/N_t$) of the pilot channel DPCCH 422 may be obtained from the equation below.

$$\frac{E_{c,pilot}}{N_t} = \frac{E_{s,rich}}{N_t} \cdot \frac{E_{c,pilot}}{E_{c,rich}}$$

In particular, the SNR ($E_{c,pilot}/N_t$) of the pilot channel DPCCH 422 is determined by taking the product of the measured SNR ($E_{s,rich}/N_t$) of the rate indicator channel R-RICH 426 (as obtained above) and the inverse of the RICH-to-pilot ratio 730 for a particular data rate over the traffic channel R-DPDCH 424 from the table 700 stored within memory 325 of the base transceiver site 110. As mentioned, the RICH-to-pilot ratio 730 is the energy-per-chip ratio between the rate indicator signal and the pilot signal ($E_{c,rich}/E_{c,pilot}$). Once the SNR ($E_{c,pilot}/N_t$) of the pilot channel DPCCH 422 is obtained, the pilot SNR may be used to more accurately perform inner-loop power control by the base transceiver site 110 for communicating with the mobile terminal 105. The manner in which the base transceiver site 110 performs inner-loop power control based on an estimated pilot SNR is well known to those of ordinary skill in the art. Accordingly, the details for determining such power control based on the pilot SNR will not be disclosed herein to avoid unnecessarily obscuring the present invention.

The symbol SNR ($E_{s,data}/N_t$) for metric scaling may be derived by the following equation.

$$\frac{E_{s,data}}{N_t} = \frac{E_{s,rich}}{N_t} \cdot \frac{E_{c,data}}{E_{c,pilot}} \cdot \frac{E_{c,pilot}}{E_{c,rich}}$$

The symbol SNR ($E_{s,data}/N_t$) is determined by taking the product of the measured SNR ($E_{s,rich}/N_t$) of the rate indicator channel R-RICH 426, the inverse of the RICH-to-pilot ratio 730, and the traffic-to-pilot ratio 720 for a particular data rate over the traffic channel R-DPDCH 424. As previously mentioned, the RICH-to-pilot ratio 730 and traffic-to-pilot ratio 720 for a particular data rate 710 on the traffic channel R-DPDCH 424 are obtained from the table 700 stored within the memory 325 of the base transceiver site 110. The estimated symbol SNR ($E_{s,data}/N_t$) is then used by the base transceiver site 110 for metric scaling in turbo decoding. The manner in which the base transceiver site 110 performs metric scaling based on an estimated symbol SNR is well known to those of ordinary skill in the art. Accordingly, the details for determining such metric scaling based on the symbol SNR will not be disclosed herein to avoid unnecessarily obscuring the present invention.

Figure 8:
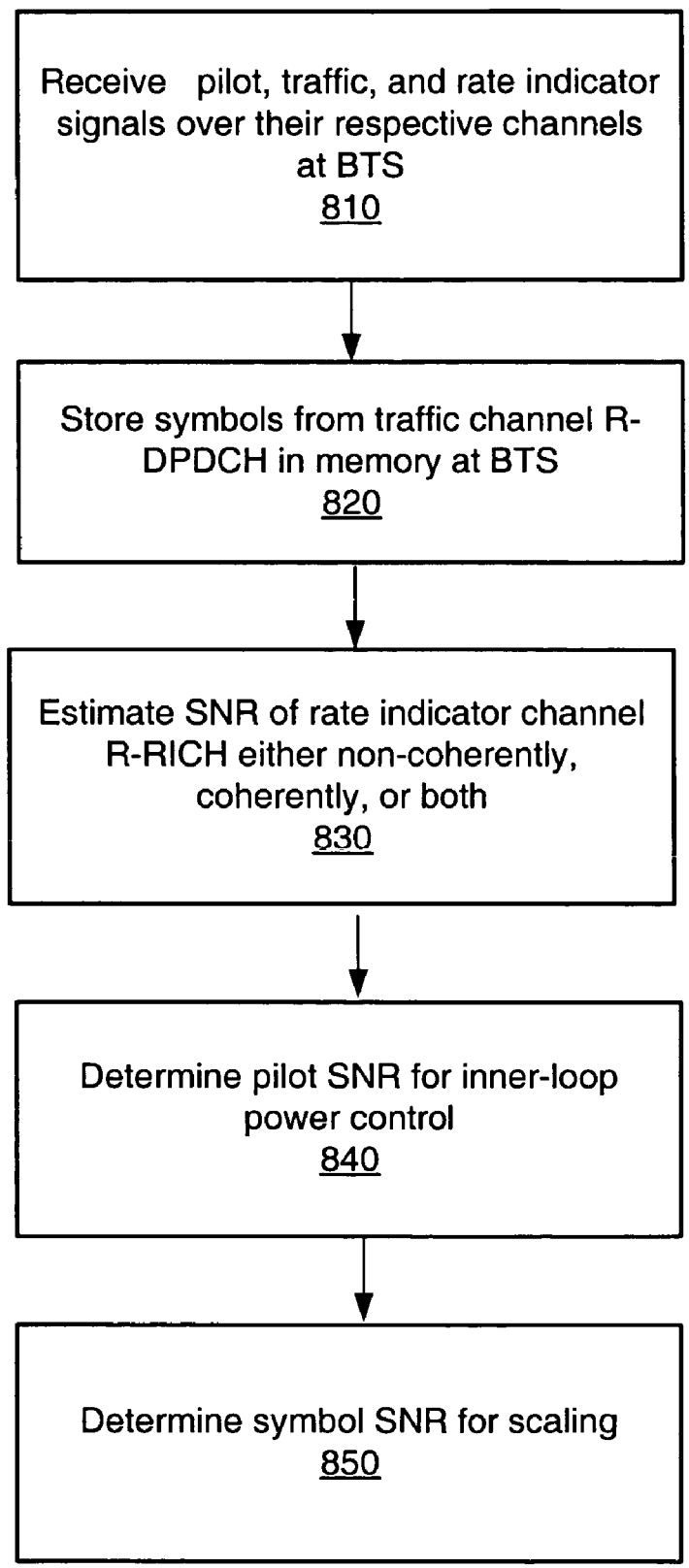
FIG. 8 is a flow diagram illustrating a method for providing an estimation of a pilot SNR and symbol SNR in accordance with one embodiment of the present invention.

Turning now to FIG. 8, a method for providing an estimation of a pilot SNR and symbol SNR is shown in accordance with one embodiment of the present invention. At block 810, the receiver 310 of the base transceiver site 110 receives the pilot, data, and rate indicator signals over the respective pilot channel DPCCH 422, traffic channel R-DPDCH 424, and rate indicator channel R-RICH 426 transmitted from the mobile terminal 105. According to one embodiment, the rate indicator channel R-RICH 426 is transmitted in a code division multiplex (CDM) manner as illustrated in FIG. 5A, in which the rate indicator channel R-RICH 426 is transmitted on a separate code channel from the traffic channel R-DPDCH 424. In an alternative embodiment, the rate indicator channel R-RICH 426 may be transmitted in a time division multiplex (TDM) manner with the traffic channel R-DPDCH 424 on the same code channel on a time division basis as illustrated in FIG. 5B.

At block 820, the base transceiver site 110 stores symbols from the traffic channel R-DPDCH 424 as they are received from the mobile terminal 105. The processor 320 of the base transceiver site 110 estimates the SNR of the rate indicator channel R-RICH 426 either non-coherently, coherently, or a combination of both coherent and non-coherent accumulation at block 830. Specifically, when accumulating the RICH symbols non-coherently, each RICH symbol's energy is summed across the RICH transmission. When accumulating the RICH symbols coherently, the base transceiver site 110 decodes the RICH first. If the RICH symbols are repeated across the transmission, the RICH may be decoded after each transmission. Once the decoding is successfully completed, the base transceiver site 110 knows the transmitted RICH symbols and may then coherently sum the received symbols. Examples of non-coherent and coherent accumulation, which provide an estimate of the RICH symbol energy ($E_{s,rich}/I_o$) have been previously provided. In one embodiment, the SNR ($E_{s,rich}/N_t$) of the rate indicator channel R-RICH 426 may then be derived by taking the product of the RICH symbol energy ($E_{s,rich}/I_o$) and the inverse of the noise power spectral density ($N_t/I_o$), the equations of which have been also previously provided.

At block 840, the processor 320 of the base transceiver site 110 determines the pilot SNR ($E_{c,pilot}/N_t$) of the pilot channel DPCCH 422 by taking the product of the measured SNR of the rate indicator channel R-RICH 426 and the inverse of the RICH-to-pilot ratio 730 for a particular data rate 710 over the traffic channel R-DPDCH 424 from the table 700 stored within memory 325 of the base transceiver site 110 as shown by the equation below.

$$\frac{E_{c,pilot}}{N_t} = \frac{E_{s,rich}}{N_t} \cdot \frac{E_{c,pilot}}{E_{c,rich}}$$

Once the SNR of the pilot channel DPCCH 422 is obtained, the pilot SNR may be used to perform inner-loop power control by the base transceiver site 110 for communicating with the mobile terminal 105 using methods well-established in the art.

At block 850, the processor 320 of the base transceiver site 110 determines the symbol SNR ($E_{s,data}/N_t$) of the traffic channel R-DPDCH 424 by taking the product of the measured SNR of the rate indicator channel R-RICH 426, the inverse of the RICH-to-pilot ratio 730, and the traffic-to-pilot ratio 720 for a particular data rate over the traffic channel R-DPDCH 424 as shown by the equation below.

$$\frac{E_{s,data}}{N_t} = \frac{E_{s,rich}}{N_t} \cdot \frac{E_{c,data}}{E_{c,pilot}} \cdot \frac{E_{c,pilot}}{E_{c,rich}}$$

As previously mentioned, the RICH-to-pilot ratio 730 and traffic-to-pilot ratio 720 for a particular data rate 710 on the traffic channel R-DPDCH 424 are obtained from the table 700 stored within the memory 325 of the base transceiver site 110. The estimated symbol SNR may then be used by the base transceiver site 110 for metric scaling in turbo decoding using methods well established in the art.

By keeping the signal power level of the pilot channel DPCCH 422 to a nominal signal power level to accommodate higher data rates over the traffic channel R-DPDCH 424 may cause the estimation of the SNR of the pilot channel DPCCH 422 to not be as precise as if it were transmitted at a higher signal power level. By measuring the SNR of the rate indicator channel R-RICH 426, which is transmitted at a higher signal power level than the pilot channel R-DPCCH 422, a more accurate estimation of the pilot channel SNR may be determined using the methods described above. As a result of achieving a more accurate SNR of the pilot channel DPCCH 422, the wireless communication system 100 may achieve a more efficient inner-loop power control and symbol scaling for turbo decoding.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for a wireless communication system, comprising:
   receiving a first signal over a first channel and a second signal over a second channel, said second signal being received at a higher signal power level than said first signal;
   measuring a signal-to-noise ratio (SNR) of the second signal; and
   determining the SNR of the first signal based at least in part upon the measured SNR of the second signal.

2. The method of claim 1, wherein said receiving at least a first signal over a first channel and a second signal over a second channel further comprises:
   receiving at least a pilot signal over the first channel and a rate indicator signal over the second channel, said rate indicator signal indicating a data rate at which a data signal is received over a third channel.

3. The method of claim 2, wherein said data signal is received over the third channel at a higher signal power level than said rate indicator signal and said pilot signal.

4. The method of claim 2, further comprising:
   determining a first energy-per-chip ratio between the rate indicator and pilot signals based at least in part upon said data rate at which said data signal is received over said third channel.

5. The method of claim 4, wherein said determining the SNR of the first signal further comprises:
   determining the SNR of the pilot signal based on the measured SNR of the rate indicator signal and the first energy-per-chip ratio between the rate indicator and pilot signals.

6. The method of claim 4, further comprising:
   determining a second energy-per-chip ratio between the data and pilot signals based at least in part upon said data rate at which said data signal is received over the third channel.

7. The method of claim 6, further comprising:
   determining the SNR of the data signal based at least upon the measured SNR of the rate indicator signal and the first and second energy-per-chip ratios.

8. An apparatus, comprising:
   at least one transmitter for transmitting a first signal over a first channel and a second signal over a second channel, said second signal being transmitted at a higher signal power level than said first signal; and
   at least one receiver for receiving the first and second signals; and wherein said receiver measures a signal-to-noise ratio (SNR) of the second signal and determines the SNR of the first signal based at least in part upon the measured SNR of the second signal.

9. The apparatus of claim 8, wherein said first signal is a pilot signal and said second signal is a rate indicator signal; and wherein said raze indicator signal indicates a data rate at which a data signal is received from the transmitter Over a third channel.

10. The apparatus of claim 9, wherein said data signal is received over the third channel at a higher signal power level than said rate indicator signal and said pilot signal.

11. The apparatus of claim 9, wherein said receiver determines a first energy-per-chip ratio between the rate indicator and pilot signals based at least in part upon said data rate at which said data signal is received over said third channel.

12. The apparatus of claim 11, wherein said receiver determines the SNR of the pilot signal based on the measured SNR of the rate indicator signal and the first energy-per-chip ratio between the rate indicator and pilot signals.

13. The apparatus of claim 11, wherein said receiver determines a second energy-per-chip ratio between the data and pilot signals based at least in part upon said data rate at which said data signal is received over the third channel.

14. The apparatus of claim 13, wherein said receiver determines the SNR of the data signal based at least upon the measured SNR of the rate indicator signal and the first and second energy-per-chip ratios.

15. The apparatus of claim 8, wherein said transmitter is a mobile terminal and said receiver is a base transceiver site.

16. The apparatus of claim 8, wherein said transmitter and said receiver communicate via a code division multiple access (CDMA) scheme.

17. A device, comprising:
   a receiver for receiving a first signal over a first channel and a second signal over a second channel, said second signal being received at a higher signal power level than said first signal; and
   a processor for measuring a signal-to-noise ratio (SNR) of the second signal and determining the SNR of the first signal based at least in part upon the measured SNR of the second signal.

18. The device of claim 17, wherein said first signal is a pilot signal and said second signal is a rate indicator signal; and wherein said rate indicator signal indicates a data rate at which a data signal is received by said receiver over a third channel.

19. The device of claim 18, wherein said data signal is received over the third channel at a higher signal power level than said rate indicator signal and said pilot signal.

20. The device of claim 18, wherein said processor determines a first energy-per-chip ratio between the rate indicator and pilot signals based at least in part upon said data rate at which said data signal is received over said third channel.

21. The device of claim 20, wherein said processor determines the SNR of the pilot signal based on the measured SNR of the rate indicator signal and the first energy-per-chip ratio between the rate indicator and pilot signals.

22. The device of claim 20, wherein said processor determines a second energy-per-chip ratio between the data and pilot signals based at least in part upon said data rate at which said data signal is received over the third channel.

23. The device of claim 22, wherein said processor determines the SNR of the data signal based at least upon the measured SNR of the rate indicator signal and the first and second energy-per-chip ratios.

24. A mobile terminal, comprising:
   a transmitter for transmitting a first signal over a first channel and a second signal over a second channel to a base transceiver site, said second signal being transmitted at a higher signal power level than said first signal; and
   wherein said base transceiver site receives said first and second signals, measures a signal-to-noise ratio (SNR) of the second signal, and determines the SNR of the first signal based at least in part upon the measured SNR of the second signal.

25. The mobile terminal of claim 24, wherein said first signal is a pilot signal and said second signal is a rate indicator signal; and wherein said rate indicator signal indicates a data rate at which a data signal is received by said base transceiver sire over a third channel.

26. The mobile terminal of claim 25, wherein said data signal is received over the third channel at a higher signal power level than said rate indicator signal and said pilot signal.

27. The mobile terminal of claim 25, wherein said base transceiver site determines a first energy-per-chip ratio between the rate indicator and pilot signals based at least in part upon said data rate at which said data signal is received over said third channel.

28. The mobile terminal of claim 27, wherein said base transceiver site determines the SNR of the pilot signal based on the measured SNR of the rate indicator signal and the first energy-per-chip ratio between the rate indicator and pilot signals.

29. The mobile terminal of claim 27, wherein said base transceiver site determines a second energy-per-chip ratio between the data and pilot signals based at least in part upon said data rate at which said data signal is received over the third channel.

30. The mobile terminal of claim 29, wherein said base transceiver site determines the SNR of the data signal based at least upon the measured SNR of the rate indicator signal and the first and second energy-per-chip ratios.

31. A computer readable media embodying a method for a wireless communication system, the method comprising:
receiving a first signal over a first channel and a second signal over a second channel, said second signal being received at a higher signal power level than said first signal;
measuring a signal-to-noise ratio (SNR) of the second signal; and
determining the SNR of the first signal based at least in part upon the measured SNR of the second signal.

32. The method of claim 31, wherein said receiving at least a first signal over a first channel and a second signal over a second channel further comprises:
receiving at least a pilot signal over a first channel and a rate indicator signal over a second channel, said rate indicator signal indicating a data rate at which a data signal is received over a third channel.

33. The method of claim 32, wherein said data signal is received over the third channel at a higher signal power level than said rate indicator signal and said pilot signal.

34. The method of claim 32, further comprising:
determining a first energy-per-chip ratio between the rate indicator and pilot signals based at least in part upon said data rate at which said data signal is received over said third channel.

35. The method of claim 34, wherein said determining the SNR of the first signal further comprises:
determining the SNR of the pilot signal based on the measured SNR of the rate indicator signal and the first energy-per-chip ratio between the rate indicator and pilot signals.

36. The method of claim 34, further comprising:
determining a second energy-per-chip ratio between the data and pilot signals based at least in part upon said data rate at which said data signal is received over the third channel.

37. The method of claim 36, further comprising:
determining the SNR of the data signal based at least upon the measured SNR of the rate indicator signal and the first and second energy-per-chip ratios.

* * * * *